United States Patent [19]
Brown et al.

[11] Patent Number: 6,152,512
[45] Date of Patent: Nov. 28, 2000

[54] GLOVE BOX DOOR LATCH ASSEMBLY

[75] Inventors: William O. Brown, Trotwood; Nicholas Fanelli, Vandalia; Robert D. Toops, Miamisburg, all of Ohio

[73] Assignee: Delphi Technologies, Inc., Troy, Mich.

[21] Appl. No.: 09/473,287

[22] Filed: Dec. 28, 1999

[51] Int. Cl.[7] ..................................................... B60N 3/12
[52] U.S. Cl. ...................................... 296/37.12; 296/37.8
[58] Field of Search ............................. 296/37.1, 37.12, 296/37.8; 312/321.5, 328; 292/34, 36, 40, 33

[56] References Cited

U.S. PATENT DOCUMENTS

| | | | |
|---|---|---|---|
| 4,223,940 | 9/1980 | Janz et al. | 296/37.12 |
| 5,595,076 | 1/1997 | Weinerman et al. | 292/34 X |
| 5,904,389 | 5/1999 | Vaishnav et al. | 296/37.12 X |

Primary Examiner—Joseph D. Pape
Attorney, Agent, or Firm—Kathryn A. Marra

[57] ABSTRACT

This invention offers advantages and alternatives over the prior art by providing a glove box including a door latch assembly which is self-contained and latches within itself eliminating the need for a striker and therefore reduces the stack-up disadvantages associated with the prior art. In an exemplary embodiment, the glove box according to the present invention generally includes a storage bin, a glove box door base portion, a glove box door outer cover, and a latch assembly. The latch assembly generally includes a handle, a connector plate, and a pair of latch arms, all of which cooperate with one another. Generally, the latch arms keep the glove box door latched by penetrating the storage bin through openings formed on side of the storage bin and openings formed in the glove box door base portion. The glove box door of the present invention has a number of integral molded features which guide the latch arms laterally, up and down, and forward and backward during operation thereof.

18 Claims, 5 Drawing Sheets

GLOVE BOX DOOR LATCH ASSEMBLY

TECHNICAL FIELD

The present invention relates generally to glove box doors and more particularly, to a glove box door latch assembly which is designed to latch within itself to provide improvements of the prior art.

BACKGROUND OF THE INVENTION

It is known in the prior art to provide a glove box door which closes an opening in the instrument panel. The glove box door is hingedly mounted to the instrument panel for pivotal movement between a closed position and an open position. A latch assembly is provided for holding the glove box door in the closed position.

Typically, the latch assembly includes a striker mounted to the instrument panel structure and a latch claw assembly mounted to the glove box door for trapping the striker when the glove box door is in the closed position. The latch claw assembly also serves to release the striker to permit the glove box door to be moved from the closed position to the open position. Prior art latch assemblies which have a latch assembly and a latch claw assembly require additional components. More specifically, the use of the striker in the assembly requires certain components to be used and the conventional latch arrangements allows for potential deficiencies with the build of the door caused by tolerance stack-up and build variation between the latching mechanism in the glove box door and the striker in the upper instrument panel. More specifically, a stack-up problem is caused by variance in the lateral and longitudinal location of the conventional glove box door in the closed position resulting in the glove box door not always fitting flushly within the instrument panel opening. Furthermore, the conventional glove boxes are often one side specific in that the glove boxes are either suitable for right hand side or left hand side.

It is therefore desirable to provide a latching assembly which has fewer parts and eliminates the deficiencies and disadvantages of the prior art.

SUMMARY OF THE INVENTION

This invention offers advantages and alternatives over the prior art by providing a glove box door latch assembly which is self-contained and latches within itself eliminating the need for a striker and therefore reduces the stack-up disadvantages associated with the prior art. As previously mentioned a striker component is usually made of metal and acts as a stationary part of conventional latching systems.

In an exemplary embodiment, the glove box door assembly according to the present invention generally includes a storage bin, a glove box door base portion, a glove box door outer cover, and a latch assembly. The latch assembly generally includes a handle, a connector plate, and a pair of latch arms, all of which cooperate with one another. The glove box door is thus formed of the glove box door base portion and the outer cover with the latch assembly being disposed intermediate to the glove box door base portion and the outer cover. Generally speaking, the latch arms keep the glove box door latched by penetrating the storage bin through openings formed on side of the storage bin and openings formed in the glove box door base portion. Thus, the opening operation of the latch assembly causes the latch arms to disengage the openings formed in the storage bin and the glove box door base portion to permit the glove box door to be open relative to the storage bin. The latch arms are maintained in a closed position by a latch spring which has a pre-tension load acting to close the latch arms relative to one another.

The connector plate includes slots for laterally self-guiding the latch arms by receiving bosses extending from the latch arms to thus restrict the lateral movement of the latch arms during a latching movement of the connector plate. The latch assembly is loaded into the glove box door base portion which has integral molded features to guide the latch arms laterally, up and down, and forward and backward. For example, the base portion included bosses which are received within openings formed in the latch arms for controlling and guiding the latch arms laterally during operation of the latch assembly. The base portion further includes ribs formed thereon and extending therefrom. The ribs are designed to guide the latch arms up and down and prevent the latching assembly from binding during operation. The openings formed in sides of the base portion provide the forward and backward guiding as well as helps lead the latching assembly into the openings formed in the storage bin when the glove box door is closed relative to the storage bin.

The latching assembly of the present invention is designed so that the opening operation of the handle forces the connector plate down and the elongated extension of the handle which is received within an opening formed in the outer cover of the glove box door contacts and displaces the connector plate. More specifically, the elongated extension contacts and displaces a tab formed on the connector plate. This downward movement of the handle is translated by the connector plate into a lateral movement of the latch arms. This results because the bosses formed on the latch arms and received within the slots of the connector plate have a restricted range of movement defined by the slots. The guided lateral movement of the latch arms causes the disengagement of the latch arms from the storage bin so as to permit the glove box door to open relative thereto. The opening force of the handle operation is controlled by a spring force of the latch spring and the angle of the slots of the connector plate, both of which are tunable to meet customer requirements. Also, the spring force provided by the latch spring keeps the handle from rattling.

Advantageously, the glove box assembly of the present invention comprises a self-contained, self-locking assembly which eliminates the need for a striker which is commonly used in conventional latching assemblies. Because the present invention eliminates the need for a striker, the present latch assembly requires fewer components in terms of both purchase parts and manufactures parts. This reduction in componentry also offers for ease of assembly and manufacturability. Furthermore, the design of the connector plate and the latch spring permits tunability to meet customer requirements form latch opening and closing forces. In addition, the present invention reduces the stack-up problems because of the self-contained design of the latch assembly.

The above-described and other features and advantages of the present invention will be appreciated and understood by those skilled in the art from the following detailed description, drawing, and appended claims.

BRIEF DESCRIPTION OF THE DRAWINGS

The present invention will now be described by way of example only, with reference to the accompanying drawing in which.

DETAILED DESCRIPTION OF THE INVENTION

Figure 1:
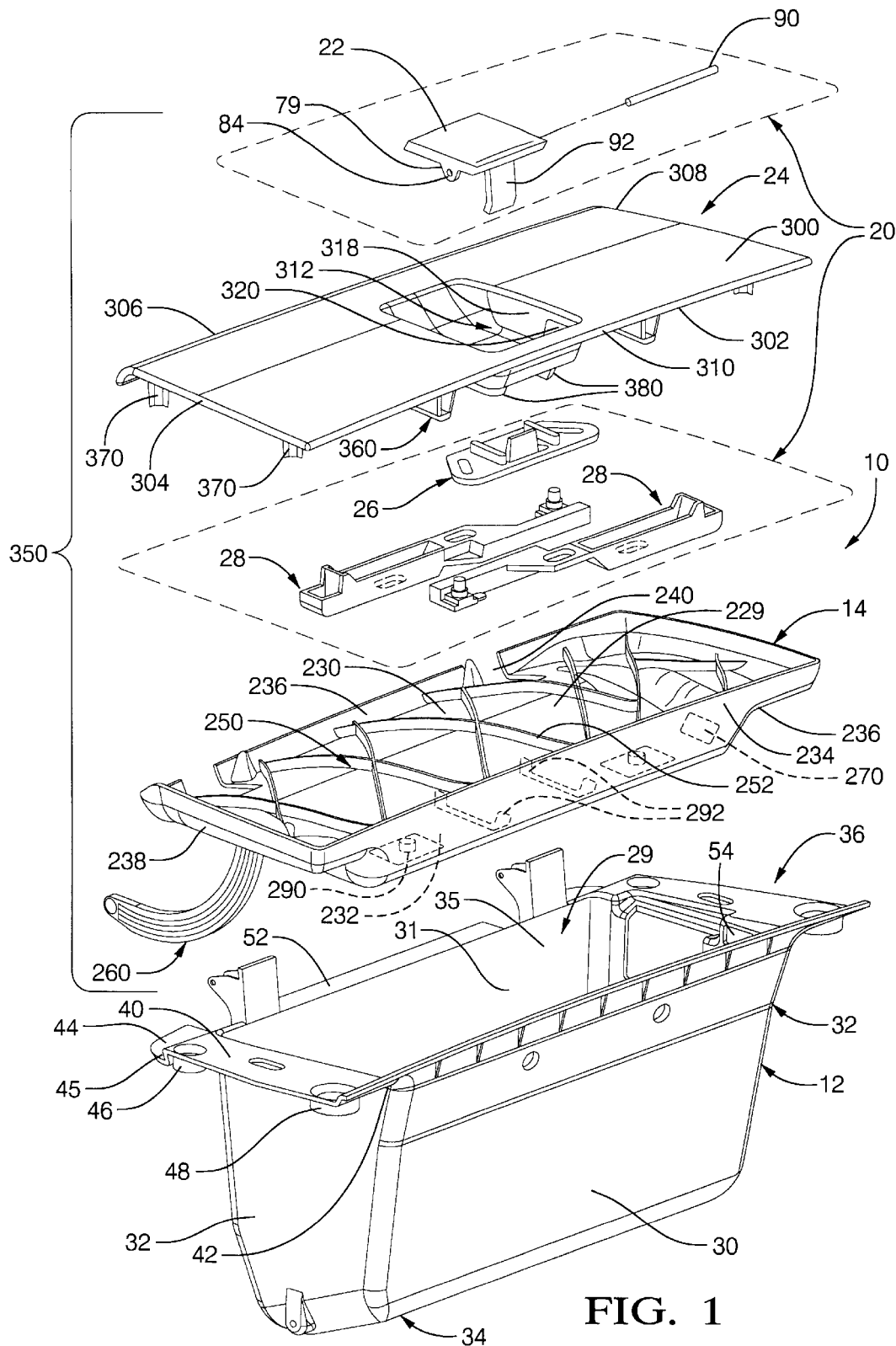
FIG. 1 is an exploded perspective view of an exemplary glove box incorporating the present invention.

Referring to FIGS. 1–5, a glove box assembly according to the present invention is generally indicated at 10. FIG. 1 shows an exploded perspective view of the glove box assembly 10. The glove box door assembly 10 generally includes a bin 12, a glove box door base portion 14, a glove box door outer cover 24, and a latch assembly generally indicated at 20. The latch assembly 20 includes a handle 22, a connector plate 26, and a pair of latch arms 28, all of which cooperate with one another and the glove box door base portion 14 and glove box door outer cover 24 to form the latch assembly 20, as will be described in greater detail hereinafter.

The bin 12 may comprise any number of conventional bins 12 having a variety of shapes and in the exemplary embodiment, the bin 12 includes a central cavity 29 defined by a pair of side walls 30, 31 and opposing end walls 32. At lower portions of the side walls 30 and end walls 32, a bottom wall 34 extends therebetween so that bin 12 is opened only at an upper portion 35 thereof. In the exemplary and illustrated embodiment, the side wall 30 comprises a front wall and the end wall 31 comprises a rear wall. It being understood that the open portion of the bin 12 serves as an entrance to the cavity 29 and permits a user to insert a hand into the cavity 29 to retrieve or place objects therein. The bin 12 has a perimetric flange 36 which extends around the upper portion 35. More specifically, the perimetric flange 36 has end portions 38 each of which extends away from the pair of end walls 32. Each end portion 38 has a generally planar section 40 which is formed between a raised rim 42 and a recessed tab portion 44 which extends away from the side wall 31. The raised rim 42 extends longitudinally across an upper portion of side wall 30 from one end portion 38 to the other end portion 38.

Figure 2:
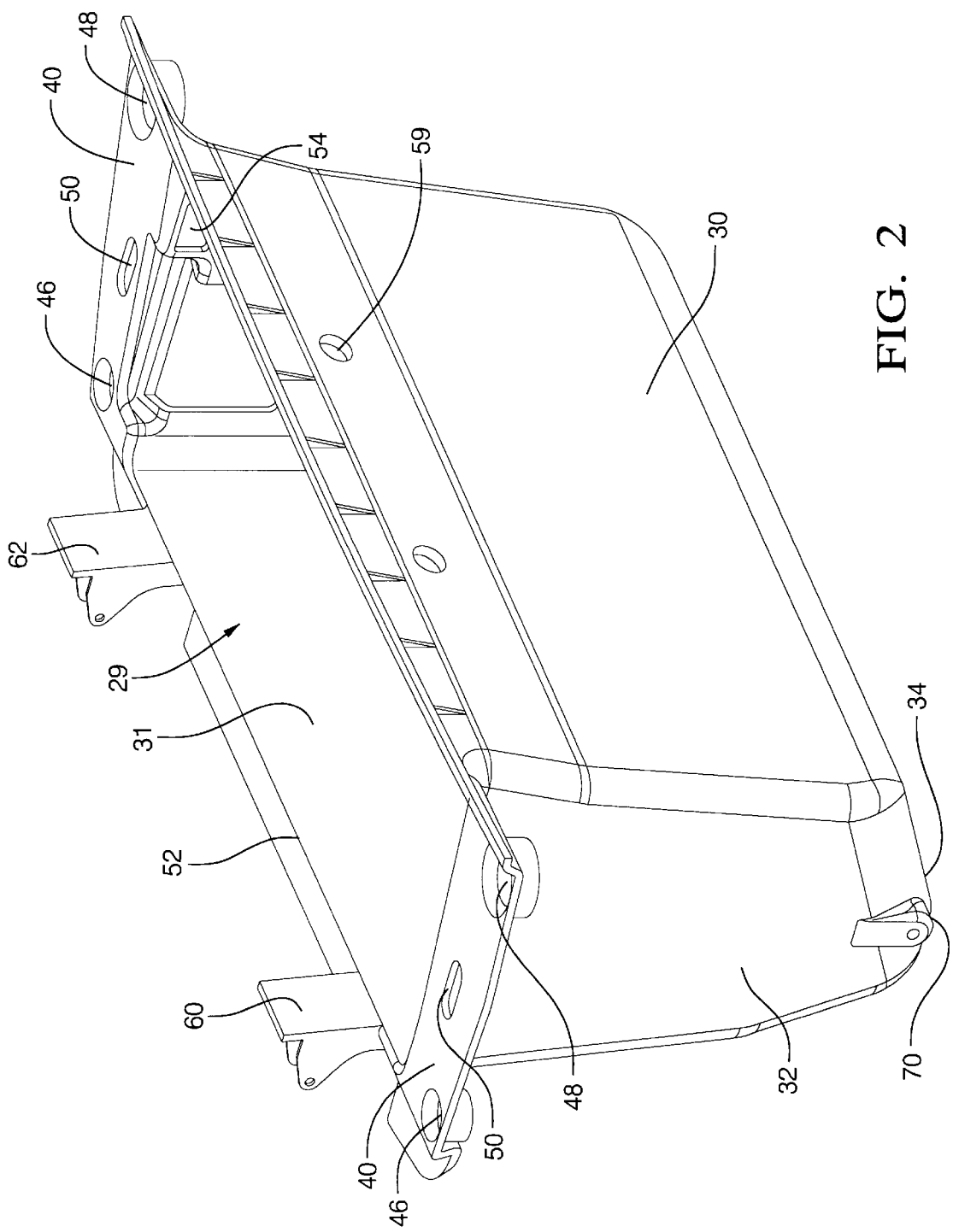
FIG. 2 is a perspective view of an exemplary glove box bin of the glove box of FIG. 1.

As a result of the tab portion 44 being recessed, a shoulder 45 is formed between the planar section 40 and the tab portion 44. The planar section 40 includes a first opening 46 formed therein adjacent the shoulder 45 and the recessed tab portion 44 and a second opening 48 formed in the planar section 40 adjacent the raised rim 42. Intermediate the first and second openings 46, 48, respectively, a third opening 50 is formed in the planar section 40. In the illustrated embodiment, the first and second openings 46, 48 are generally circular in shape and the third opening 50 has a generally rectangular shape. Because the first, second, and third openings 46, 48, 50 are formed in the planar sections 40 which extends beyond the end walls 32, the openings 46, 48, 50 permit members to be disposed therethrough without interfering with the end walls 32. The planar section 40 preferably lies in the same plane as a topmost edge 52 of the side wall 31. As best shown in FIG. 2, each end wall 32 includes a slot 54 formed therein near a topmost edge of the end wall 32. In the illustrated embodiment, the slot 54 is rectangular in shape and is formed in the end wall 32 closer to the side wall 30 than the side wall 31. The exemplary bin 12 also includes a pair of fourth openings 59 formed in the side wall 30. The fourth openings 59 are located proximate the raised rim 42 which extends across the side wall 30. The fourth openings 59 are designed to provide venting ports for the cavity 29. The bin 12 also includes a pair of connecting and support members in the form of arms 60, 62 which extend upwardly away from the topmost edge 52 of the side wall 31. As will be described in greater detail hereinafter, the arms 60, 62 provide support for the glove box door base portion 14 during the assembly of glove box assembly 10. The pair of end walls 32 further include a pair of openable ports 70 formed in the end walls 32 near where each end wall 32 abuts the bottom wall 34.

Figure 3:
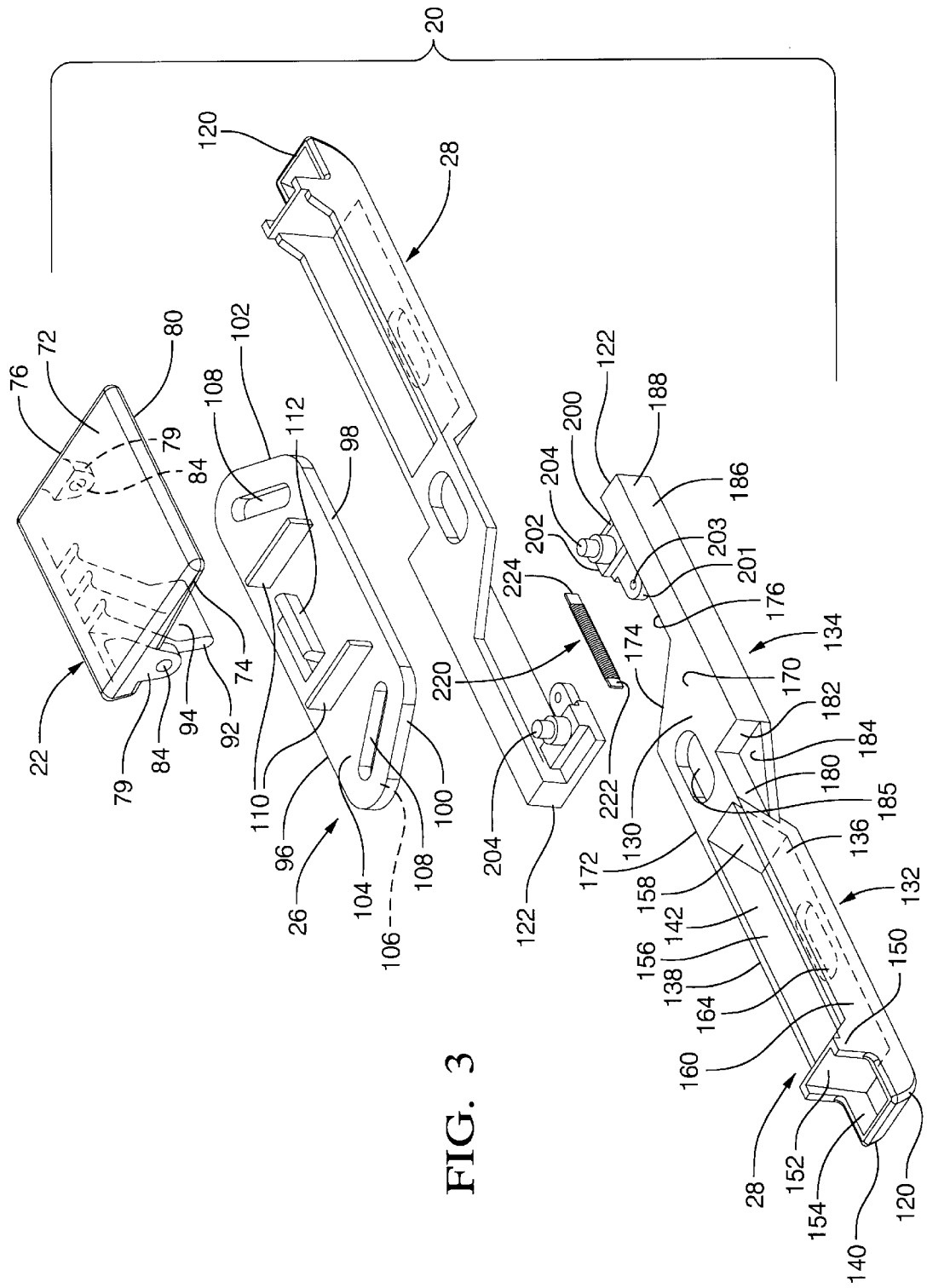
FIG. 3 is an exploded perspective view of an exemplary glove box latch assembly of the glove box of FIG. 1.

Referring now to FIGS. 1 and 3. FIG. 3 is a perspective view of a portion of the latch assembly 20. The handle 22 includes a top base portion 72 which has opposing sides 74, 76 and opposing ends 78, 80. Each of the opposing sides 74, 76 includes a connecting tab 79 extending therefrom in a direction away from the top base portion 72. The connecting tab 79 may take a variety of shapes and in the illustrated embodiment, the connecting tab 79 is generally semicircular in shape and is integrally formed with the top base portion 72. Each of the connecting tabs 79 includes an opening 84 formed therein for receiving a coupling member 90. As shown in FIG. 1, an exemplary coupling member 90 comprises a pin which is used to pivotally connect the handle 22 to the glove box door outer cover 24. The handle 22 also includes an elongated handle extension 92 which extends away from end 78 of the handle 22. Preferably, the elongated handle extension 92 is integrally formed with the top base portion 72. As best shown in FIG. 3, the elongated handle extension 92 has a sloped portion 94 facing away from end 78.

As shown in FIG. 3, the exemplary connector plate 26 is generally trapezoidal in shape and includes opposing substantially parallel edges 96, 98 and opposing non-parallel edges 100, 102. The connector plate 26 further includes a first surface 104 and an opposing second surface 106. Formed proximate each of the opposing non-parallel edges 100, 102 is a slot 108. In the illustrated embodiment, slot 108 has an oblong shape and is generally formed so that a longitudinal axis of the slot 108 is generally parallel to one of the non-parallel edges 100, 102. The slots 108 are formed completely through the connector plate 26 so that a member may extend therethrough. The connector plate 26 also includes a pair of opposing tabs 110 which extend between the edges 96, 98 and from the second surface 106. The opposing tabs 110 are formed intermediate the slots 108 and preferably the opposing tabs 110 are perpendicular to both edges 96, 98. In an exemplary embodiment, each tab 110 is rectangular in shape. The connector plate 26 also has a center tab 112 which is formed on the second surface 106 and is formed intermediate the opposing tabs 110. The center tab 112 is orientated so that it is parallel to edges 96, 98 and is formed nearer to edge 96.

The latch assembly 20 further includes latch arms 28. In the preferred and illustrated embodiment, the latch assembly 20 includes two latch arms 28. Each latch arm 28 is symmetrical in nature relative to one another. In view of the symmetrical nature of the latch arms 28 and for the purpose of illustration, a single latch arm 28 will be described in detail. The latch arm 28 has a first end 120 and an opposing second end 122. The latch arm 28 generally has a center portion 130, a first portion 132 which extends from the first end 120 to the center portion 130 and a second portion 134 which extends from the second end 122 to the center portion 130. The first portion 132 includes opposing side walls 136, 138 and a first end wall 140 which defines first end 120. Intermediate the side walls 136, 138, a recessed cavity 142 is formed. The first end wall 140 has an arcuate surface in the exemplary embodiment. The side walls 136, 138 each have a section 150 which projects upwardly away from the recessed cavity 142. An intermediate wall 152 extends between the opposing side walls 136 in between the projections 150 such that the cavity 142 is partitioned into a first compartment 154 which extends from the first end wall 140 to the intermediate wall 152 and a second compartment 156 which extends from the intermediate wall 152 to a second end wall 158 which opposes the first end wall 140 and is parallel thereto. Second end wall 158 is preferably beveled in nature and leads up to the center portion 130. The first and second end walls 140, 158 are substantially perpendicular to the side walls 136, 138. The sections 150 extend above the upper edges of the side walls 136, 138 and likewise the intermediate wall 152 extends above the upper edges of the side walls 136, 138. Formed within a bottom surface 160 of the first portion 132 is an opening 164. In the illustrated embodiment, the opening 164 has a generally oblong shape. The center portion 130 has a first surface 170 which extends from the second end wall 158 to the second end 122 of the latch arm 22. The center portion 130 has a first section 172 which comprises a portion of the side wall 138, wherein the first section 172 terminates at a first angled section 174 which lies between the first section 172 and a second section 176 which terminates at second end 122. Opposite the first section 172, the center portion 130 includes third and fourth sections 180, 182 which are perpendicular to each other and partially define a recessed platform 184 which generally lies in the same plane as the bottom surface 160. Opposite the second section 176 is a fifth section 186 which extends from the fourth section 182 to the second end 122. Second end 122 is defined by an end wall 188 which extends between the second section 176 to the fifth section 186. The center portion 130 also includes an oblong opening 185 which is formed therein.

The second portion 134 includes a tab 200 which extends outwardly from the second wall 176 and the fifth wall 186. The tab 200 includes a raised platform 202 and a first boss 204 extending upwardly from the raised platform 202. In the illustrated embodiment, the first boss 204 is circular in shape. The latch assembly 20 further includes a spring 220 having a first end 222 and an opposing second end 224. Also extending away from tab 200 is a second tab 201 which is generally arcuate in shape and in an exemplary embodiment is semicircular in shape and includes a center opening 203. The second tab 201 extends away from the tab 200 in the direction towards the first end 120.

Figure 4:
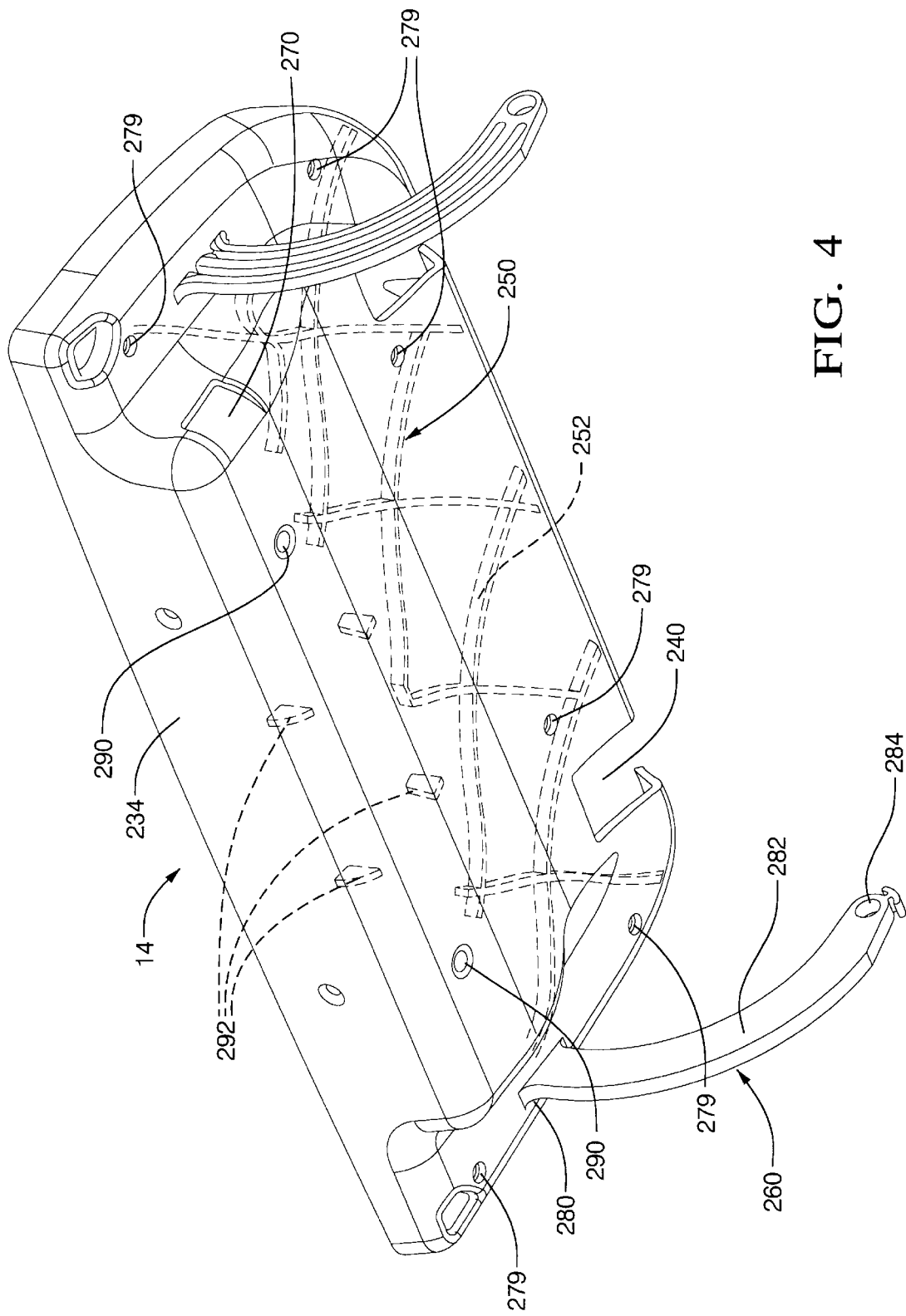
FIG. 4 is a perspective view of an exemplary glove box door base portion of the glove box of FIG. 1.

Now referring now to FIGS. 1 and 4. The glove box door base portion 14 includes a bottom section 229 having a first surface 230 and an opposing second surface 232, wherein the first surface 230 faces away from the bin 12 and the second surface 232 faces the bin 12 and the cavity 29 formed therein. The glove box door base portion 14 further includes a front section 234, an opposing rear section 236, and opposing side sections 238, 240 all of which are raised relative to the first surface 230. Accordingly, in the illustrated embodiment, the glove box door base portion 14 has a generally rectangular shape. The front section 234 has a pair of tapered end portions 236 which have a narrower width than a width of the remaining portion of front section 234 which is intermediate the tapered end portions 236. The glove box door base portion 14 includes a pair of slots 240 which are formed therein and more specifically, the slots 240 are partially formed in the rear section 236 and extend downwardly and inwardly into the bottom section 229. As shown, the exemplary slots 240 have a generally rectangular shape.

The glove box door base portion 14 has a plurality of guide tracks 250 formed on the first surface 230 of the bottom section 229. In the exemplary embodiment, the guide tracks 250 are formed of a plurality of raised rails, generally indicated at 252, having sections which intercross and intersect other to form a number of "X" shaped members formed on and extending upwardly away from the first surface 230. The guide tracks 250 are formed between the front section 234 and the rear section 236 and the side sections 238, 240. Also formed within the glove box door base portion 14 are a pair of side openings 270, wherein one side opening 270 is formed at a side section 272 and another is formed at a side section 274 of the glove box door base portion 14. More specifically, one side opening 270 generally is formed where the side section 238 and bottom section 229 integrally converge and the other side opening 270 is formed where the side section 240 and the bottom section 229 integrally converge. In the illustrated embodiment, each side opening 270 has a generally rectangular shape.

The glove box door base portion 14 also has a pair of integral bosses 290 which extend upwardly from the first surface 230 of the bottom section 229. As best shown in FIG. 4, the bosses 290 have a circular shape. The bosses 290 are formed intermediate the side openings 270. Intermediate to the bosses 290 is a plurality of ribs 292 which are formed on and likewise extend upwardly from the first surface 230 of the bottom section 229. In the exemplary embodiment, the ribs 292 have a generally rectangular shape. The glove box door base portion 14 further has a pair of legs 260 which extend downwardly away from the second surface 232. Each of leg 260 has a first end 280 integrally connected to the second surface 232 and a free second end 282. Each leg 260 has an arcuate shape such that leg 260 extends rearwardly towards rear section 236 before terminating with the second end 282. The exemplary leg 260 has a plurality of grooves 282 formed therein and a leg opening 284 formed at second end 282.

Figure 5:
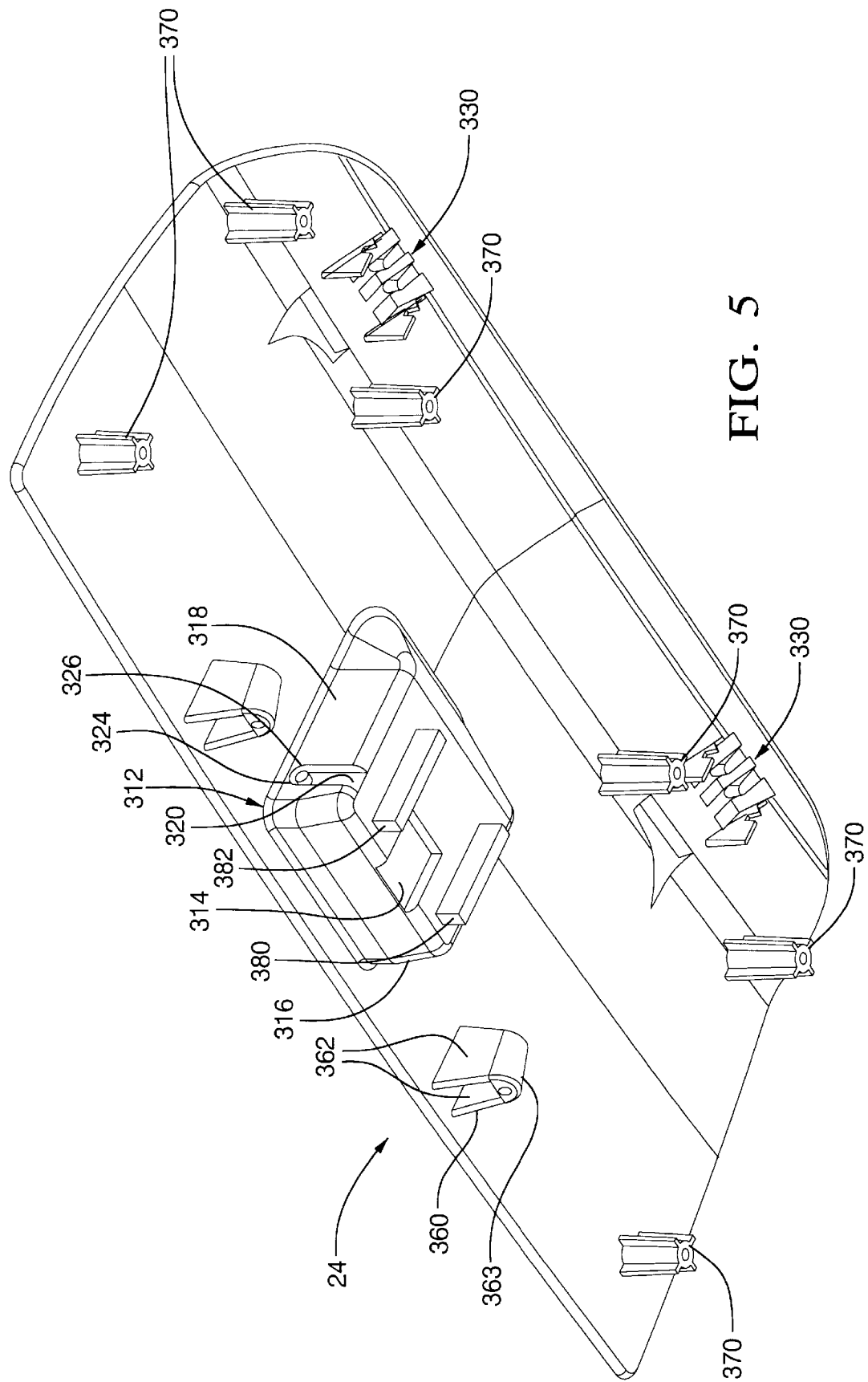
FIG. 5 is a perspective view of an exemplary glove box door outer cover of the glove box of FIG. 1.

Now referring to FIGS. 1 and 5. The glove box door outer cover 24 has a first cover surface 300 and an opposing second cover surface 302. In the illustrated embodiment, the glove box door outer cover 24 has a generally rectangular shape and is defined by edges 304, 306, 308, 310. The glove box door outer cover 24 has a recessed handle portion 312 which is integrally formed in the glove box door outer cover 24 and is recessed relative to the surrounding portions of the first cover surface 300 and extends below the second cover surface 302. The exemplary recessed handle portion 312 is generally square shaped and is intended to receive the handle 22 and permit the user to position his/her hand within the recessed handle portion 312 underneath the handle 22 so as to permit a lifting action of the handle 22 relative to the glove box door outer cover 24. The recessed handle portion 312 further includes a handle opening 314 which is formed therein and permits the elongated handle extension 92 to extend therethrough so as to accommodate and properly position the handle 22 within the recessed handle portion 312.

On each of the recessed side walls 316, 318 of the recessed handle portion 312, a notch 320 is formed therein. At a top portion of the notch 320 is a connecting member 322 which serves to attach the handle 22 to the glove box door outer cover 24. In an exemplary embodiment, the connecting member 322 comprises an arcuate tab 324 which extends into the notch 320. The arcuate tab 324 has an opening 326 formed therein to receive the coupling member (e.g., pin) 90 so as to pivotally connect the handle 22 to the glove box door outer cover 24. The handle 22 is first positioned properly relative to the glove box door outer cover 24 by extending the elongated handle extension 92 through the handle opening 314 and passing the coupling member 90 through the openings 84 formed in the connecting tabs 79 and then through the openings 326 of the arcuate tabs 324 so as to pivotally connect the handle 22 to the glove box door outer cover 24.

The second cover surface 302 has a number of integral features formed thereon and extending outwardly therefrom. As previously mentioned, the recessed handle portion 312 extends below the surrounding sections of the second cover surface 302. A pair of hinging members 330 are formed on the second cover surface 302 and extend downwardly therefrom and serve to hindgedly connect the assembled glove box door, generally indicated at 350 in FIG. 1 and comprising glove box door outer cover 24, latch assembly 20, and glove box door base portion 14, to the bin 12 as will be described hereinafter in greater detail. Each exemplary hinging member 330 includes a number of spaced angled members which mate with a complementary connecting member (not shown) of the bin 12 so as to secure both components to one another. Slots 240 formed in the glove box door base portion 14 are intended to receive the hinging members 330 and the complementary connecting members when the glove box door 350 is hingedly connected to the bin 12.

The glove box door outer cover 24 also includes a pair of open ended tabs 360 which are formed on the second cover surface 302. Each of the open ended tabs 360 has a pair of side walls 362 and a bottom wall 363 extending therebetween so that a cavity is formed therebetween at an end facing away from the edge 306. The pair of open ended tabs 360 is formed so that the recessed handle portion 312 is disposed intermediate thereto. The glove box door outer cover 24 also includes a plurality of locating tabs 370. In the exemplary illustrated embodiment, the glove box door outer cover 24 has six tabs 370 which extend outwardly away from the second cover surface 302. Two of the tabs 370 are located near the edge 310 disposed about the open ended tabs 360 and the other four tabs 370 are formed near the edge 306. The four tabs 370 are generally located between the recessed handle portion 312 and the hinging members 330. In the exemplary embodiment, each tab 370 has a star shaped cross section. The glove box door outer cover 24 also includes a pair of raised rails 380 which are formed on and extend away from the second cover surface 302. More specifically, the raised rails 380 are formed on the bottom surface of the recessed handle portion 312 and extend between the edges 306, 310. Each raised rail 380 includes a channel 382 formed therein and the raised rails 380 are generally parallel to one another and are parallel to the open ended tabs 360.

Referring to FIGS. 1–5. The glove box door base portion 14 also includes a plurality of openings 279 which are designed to receive the plurality of tabs 370 to position the glove box door outer cover 24 relative to the glove box door base portion 14. At least some of the tabs 370 extend through the first and second openings 46, 48 of the planar section 40 of the bin 12 when the glove box door 350 is in a closed position.

The assembly of glove box assembly 10 will now be described with reference to FIGS. 1–5. Broadly, the latch arms 28 keep the glove box door 350 latched by penetrating the pair of side openings 270 of the glove box door base portion 14 and the slots 54 of the bin 54. Accordingly, disengagement of the latch arms 28 therefrom permits the glove box door 350 to open relative to the bin 12.

The glove box door 350 is preferably assembled first prior to the glove box door 350 being attached to the bin 12. The latch arms 28 are positioned within the glove box door base portion 14 by placing one of the latch arms 28 underneath the other latch arm 28 so that the integral boss 204 of the bottom latch arm 28 is received within the oblong opening 185 of the top latch arm 28. Thus, the latch arms 28 are laterally self-guided by the integral boss 204 traveling within the oblong opening 185. The spring 220 serves to keep the latch arms 28 in a closed position because the spring 220 has a predetermined pre-tension load. The spring 220 is received in both center openings 203 of the second tabs 201 so that the latch arms 28 are connected in tension to one another.

The latch arms 28 including the spring 220 attached thereto are loaded into the glove box door base portion 14 wherein the molded integral features thereof guide the latch arms 28 laterally, up and down, and forward and backward. More specifically, the molded integral boss 290 of the bottom latch arm 28 guides the latch arms 28 laterally by being inserted within the opening 164 of the top latch arm 28. The opening 164 thus limits the lateral movement of the bottom latch arm 28 because the boss 290 is only permitted to travel within the opening 164 of the top latch arm 28 and thus the lateral movement of the latch arms 28 is restricted. The integral ribs 292 guide the latch arms 28 up and down preventing the latching assembly 20 from binding during actuation and movement thereof.

The pair of side openings 270 formed at the first and second ends 272, 274 of the glove box door base portion 14 provides the forward and backward guiding of the latch arms 28. In addition, when the glove box door 350 is properly attached to the bin 12 and the glove box door 350 is in a closed position, the side openings 270 of the glove box door base portion 14 are aligned with the slots 54 formed in end walls 32 of the bin 12. Because of this alignment, the side openings 270 also help lead the latching assembly 20 and more specifically, the latch arms 28 into the slots 54 of the bin 12 so as to effectuate the latching of the glove box door 350 to the bin 12 when the latch arms 28 penetrate the slots 54 of the bin 12.

The connector plate 26 is designed to translate the up and down motion of the of the operation of the elongated handle extension 92 to a lateral motion of the latch arms 28 because the integral bosses 290 of the latch arms 28 extend through the slots 108 of the connection plate 26. Accordingly, movement of the connector plate 26 by operation of the handle 22 as will be described hereinafter causes movement of the connector plate 26 and because the integral bosses 290 are disposed within the slots 108, the movement of the connector plate 26 likewise causes movement of the latch arms 28. The opposing tabs 110 of the connector plate 26 are received or loaded within the channels 382 of the raised rails 380. The interaction between the opposing tabs 110 and the channels 382 acts to guide the latch arms 28 and prevent binding thereof.

The operation of latch assembly 20 will now be described in detail. When the user lifts the top base portion 72 of the handle 22, the lifting action causes the elongated handle extension 92 to contact the center tab 112 of the connector plate 26. This results in the connector plate 26 being forced downward and the angled slots 108 of the connector plate 26 takes the down motion of the handle operation and translates it to a lateral motion of the latch arms 28 because as previously mentioned the bosses 290 travel with the slots 108. Accordingly, the movement of the connector plate 26 causes the latch arms 28 to likewise move laterally. The lateral movement of the latch arms 28 results in the latch arms 28 becoming disengaged from the bin 12. More specifically, the lateral movement of the latch arms 28 causes the first ends 120 thereof to disengage the side openings 270 of the glove box door base portion 14 and the slots 54 of the bin 12. Once the latch arms 28 disengage the bin 12 and the glove box door base portion 14, the glove box assembly 10 is unlatched and the glove box door 350 is free to open relative to the bin 12. The opening force of the operation of handle 22 is controlled by the spring force of the latch spring 220 and the angle of the slots 108 of the connector plate 26 both of which are tunable to meet the requirements of individual users and customers.

The glove box assembly 10 of the present invention overcomes the deficiencies and limitations of the prior art. More specifically, the limitations of the build of the door caused by tolerance stack-up and build variation between the conventional latching mechanisms in the glove box door and the striker in the upper instrument panel. The present invention overcomes these deficiencies by providing a self-contained latch assembly 20 that would latch within itself and therefore eliminate the need for the striker and reduce stack-up problems. The self-contained glove box assembly 10 of the present invention has common components that permit for error-proofing and reduction in both purchase parts and manufactured parts. This reduction in componentry also permits for ease of assembly and manufacturability. In addition, the design of the connector plate 26 and the spring 220 permits for tunability to meet customer requirements for latch opening and closing forces. The symmetrical nature of the present invention renders the present invention suitable for use in both right side driving countries, e.g., the United States of America, and left side driving countries, e.g., Great Britain.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly with the scope and spirit of the claims.

What is claimed is:

1. A glove box for use in a vehicle, the glove box comprising:
    a storage bin;
    a glove box door pivotally mounted to the storage bin, the glove box door having an outer cover and a base portion; and
    a glove box door latch assembly cooperating with the glove box door, the latch assembly including:
        a connector plate disposed between the outer cover and the base portion, the connector plate having a first tab formed thereon and extending therefrom and a pair of slots formed therein;
        a handle having an elongated extension for causing unlatching of the glove box door from the storage bin; and
        a pair of latch arms disposed between the outer cover and the base portion, the latch arms being biased against one other, the latch arms each having a boss which is received within the slots of the connector plate for guiding the lateral movement of the latch arms such that operation of the handle causes the connector plate to move and the motion of the connector plate is translated into lateral movement of the latch arms for disengaging the latch arms from openings formed in the glove box door and the storage bin thereby freeing the glove box door from the storage bin.

2. The glove box as set forth in claim 1, wherein a spring having a pre-tension load is used to bias one latch arm against the other latch arm.

3. The glove box as set forth in claim 1, wherein one latch arm is disposed above the other latch arm so that one boss of one latch arm is disposed in a first opening formed in the one latch arm extends through one of the slots formed in the connector plate, the other boss extending through the other slot formed in the connector plate.

4. The glove box as set forth in claim 1, wherein the connector plate has a pair of second tabs extending therefrom, the second tabs being disposed within guide channels formed in the outer cover of the glove box door so that the interaction between the second tabs and the guide channels serves to guide the pair of latch arms and prevent binding thereof during operation of the handle.

5. The glove box as set forth in claim 1, wherein the base portion includes a plurality of guides formed on a surface thereof, the plurality of guides serving to guide the latch arms during operation thereof.

6. The glove box as set forth in claim 5, wherein the plurality of guides comprise raised rails orientated according to a predetermined pattern.

7. The glove box as set forth in claim 6, wherein the predetermined pattern is a criss-cross pattern.

8. The glove box as set forth in claim 1, wherein the base portion of the glove box door includes a pair of ribs extending therefrom for guiding the latch arms up and down and prevent the latch assembly from binding during operation thereof.

9. The glove box as set forth in claim 8, wherein the pair of ribs is disposed between a number of guides.

10. The glove box as set forth in claim 1, wherein the base portion of the glove box door includes second bosses extending therefrom, the second bosses being received within boss openings formed in the latch arms for guiding the latch arms laterally during operation thereof.

11. The glove box as set forth in claim 1, wherein the outer cover includes a recessed portion having an opening formed therein, the opening receiving the elongated extension of the handle.

12. The glove box as set forth in claim 1, wherein the connector plate and the pair of latch arms of the latch assembly are disposed intermediate to the outer cover and the base portion.

13. The glove box as set forth in claim 1, wherein the openings formed in the glove box door comprise a first opening formed in a first side portion of the base portion and a second opening formed in a second side portion of the base portion, the openings formed in the storage bin comprising a first bin opening formed in a first side wall and a second bin opening formed in a second side wall.

14. The glove box as set forth in claim 1, wherein each of the pair of latch arms includes a first end having a ridge extending upwardly from the latch arm, the ridge being formed proximate the first end so that a first end portion is defined between the ridge and the first end, the first end portion being the portion of the latch arm which engages and disengages the openings formed in the glove box door and the storage bin.

15. The glove box as set forth in claim 1, wherein the outer cover of the glove box door includes a plurality of locating tabs extending downwardly from a bottom surface of the outer cover, the plurality of locating tabs being received within locating openings formed in the base portion of the glove box door.

16. The glove box as set forth in claim 4, wherein the first tab is formed intermediate to the pair of second tabs, the first tab being formed generally perpendicular to the pair of second tabs.

17. The glove box as set forth in claim 1, wherein each latch arm includes a first end and a second end, the first end being the portion of the latch arm which engages and disengages the storage bin for securing the glove box door to the storage bin, wherein the boss is formed at the second end and extends outwardly from the latch arm.

18. The glove box as set forth in claim 1, wherein one latch arm is disposed symmetrically relative to the other latch arm.

* * * * *